US011007733B2

(12) United States Patent
Sekiguchi (10) Patent No.: US 11,007,733 B2
(45) Date of Patent: May 18, 2021

(54) PUNCTURE REPAIR LIQUID HOLDING CONTAINER

(71) Applicant: The Yokohama Rubber Co., LTD., Tokyo (JP)

(72) Inventor: Takumi Sekiguchi, Hiratsuka (JP)

(73) Assignee: The Yokohama Rubber Co., LTD.

( * ) Notice: Subject to any disclaimer, the term of this patent is extended or adjusted under 35 U.S.C. 154(b) by 120 days.

(21) Appl. No.: 15/766,771

(22) PCT Filed: Sep. 12, 2016

(86) PCT No.: PCT/JP2016/076843
§ 371 (c)(1),
(2) Date: Apr. 6, 2018

(87) PCT Pub. No.: WO2017/061238
PCT Pub. Date: Apr. 13, 2017

(65) Prior Publication Data
US 2018/0297303 A1    Oct. 18, 2018

(30) Foreign Application Priority Data
Oct. 7, 2015   (JP) .............................. JP2015-199599

(51) Int. Cl.
*B29C 73/02*   (2006.01)
*B29C 73/16*   (2006.01)
(Continued)

(52) U.S. Cl.
CPC ............ *B29C 73/02* (2013.01); *B29C 73/166* (2013.01); *B29C 73/24* (2013.01); *B60C 23/00* (2013.01)

(58) Field of Classification Search
USPC .......................................... 137/68.23, 68.19
See application file for complete search history.

(56) References Cited

U.S. PATENT DOCUMENTS 3,294,277 A  *  12/1966  Wood ................. F16K 17/1613
                                                          220/89.3
3,834,580 A  *  9/1974  Ludwig ............... F16K 17/1613
                                                          220/89.2
(Continued)

FOREIGN PATENT DOCUMENTS

CN           1356243        7/2002
DE    10 2006 059 479       8/2007
(Continued)

OTHER PUBLICATIONS

International Search Report for International Application No. PCT/JP2016/076843 dated Nov. 22, 2016, 6 pages, Japan.

*Primary Examiner* — Daphne M Barry
(74) *Attorney, Agent, or Firm* — Thorpe North & Western (57) ABSTRACT

A puncture repair liquid holding container is formed from: a container main body provided with a holding portion and an opening portion; and a cap attached to the opening portion, including a second flow channel for the cap to discharge the puncture repair liquid inside the container, wherein a tube extending toward an inner side of the container main body is attached to the second flow channel, the tube is provided with a sealing film that blocks inflow of the puncture repair liquid to the second flow channel, and a closed condition where the sealing film blocks the second flow channel can be switched to an opened condition where the sealing film is broken by container internal pressure such that the second flow channel is opened.

4 Claims, 6 Drawing Sheets

(51) Int. Cl.
*B29C 73/24* (2006.01)
*B60C 23/00* (2006.01)

(56) References Cited

U.S. PATENT DOCUMENTS

| | | | | |
|---|---|---|---|---|
| 4,236,648 | A * | 12/1980 | Wood | F16K 17/1613 |
| | | | | 220/89.3 |
| 4,269,214 | A * | 5/1981 | Forsythe | F16K 17/1613 |
| | | | | 137/68.26 |
| 4,301,938 | A * | 11/1981 | Wood | F16K 17/1626 |
| | | | | 137/68.24 |
| 4,394,926 | A * | 7/1983 | Ou | F16K 17/1613 |
| | | | | 137/68.26 |
| 6,220,269 | B1 * | 4/2001 | Muddiman | F16K 17/16 |
| | | | | 137/68.26 |
| 7,389,800 | B2 * | 6/2008 | Hickman | B29C 73/166 |
| | | | | 141/26 |
| 7,748,295 | B2 * | 7/2010 | Hong | B29C 73/166 |
| | | | | 81/15.6 |
| 7,854,242 | B2 | 12/2010 | Stehle | |
| 8,016,002 | B2 * | 9/2011 | Yoshida | B29C 73/166 |
| | | | | 141/38 |
| 8,453,683 | B2 * | 6/2013 | Yoshida | B29C 73/166 |
| | | | | 141/38 |
| 9,156,212 | B2 * | 10/2015 | Taniguchi | B29C 73/025 |
| 2003/0056851 | A1 * | 3/2003 | Eriksen | B60S 5/043 |
| | | | | 141/38 |
| 2003/0155005 | A1 * | 8/2003 | Siimes | F16K 17/162 |
| | | | | 137/68.23 |
| 2006/0217662 | A1 * | 9/2006 | Hickman | B29C 73/166 |
| | | | | 604/153 |
| 2007/0181209 | A1 | 8/2007 | Stehle | |
| 2008/0202595 | A1 * | 8/2008 | Melrose | F16K 17/1606 |
| | | | | 137/68.23 |
| 2008/0257448 | A1 | 10/2008 | Hickman et al. | |
| 2015/0053682 | A1 | 2/2015 | Sekiguchi | |
| 2017/0043545 | A1 | 2/2017 | Naruse | |

FOREIGN PATENT DOCUMENTS

| | | |
|---|---|---|
| DE | 10 2007 026 776 | 12/2008 |
| DE | 10 2008 015 022 | 11/2009 |
| JP | 2007-210678 | 8/2007 |
| JP | 2009-208343 | 9/2009 |
| JP | 2013-216329 | 10/2013 |
| JP | 5682722 | 3/2015 |
| WO | WO 2006/104919 | 10/2006 |
| WO | WO 2008/151870 | 12/2008 |
| WO | WO 2009/115368 | 9/2009 |
| WO | WO 2013/150843 | 10/2013 |
| WO | WO 2015/159828 | 10/2015 |

* cited by examiner

PUNCTURE REPAIR LIQUID HOLDING CONTAINER

TECHNICAL FIELD

The present technology relates to a puncture repair liquid holding container, and particularly relates to a puncture repair liquid holding container that closes a flow channel by a simple structure and reliably prevents liquid leaking during storage, while allowing the flow channel to easily open during puncture repair work.

BACKGROUND ART

In recent years, when a tire mounted to a vehicle is punctured, a puncture repair liquid is injected into the tire through a tire valve to temporarily repair the puncture. An example of a device capable of temporary repair includes a puncture repair kit. When the puncture repair kit is used, the need to provide a vehicle with a spare tire is eliminated, and thus resource saving and vehicle weight reduction are possible. Furthermore, there is an advantage where a spare tire mounting space in a vehicle can be utilized for another purpose.

An example of a known puncture repair kit includes a so-called pump-type puncture repair kit that injects a puncture repair liquid held in a puncture repair liquid holding container into a tire by compressed air supplied from an air compressor or the like. The puncture repair liquid holding container used in the pump-type puncture repair kit is configured from: a container main body provided with an opening portion and a holding portion where puncture repair liquid is held; and a cap attached to the opening portion of the container main body. Furthermore, the cap is provided with a first flow channel for introducing compressed air from outside the container, and a second flow channel for discharging the puncture repair liquid inside the container. Furthermore, a tube extending toward in an inner portion of the container main body is attached to the second flow channel. At this time, in order to prevent puncture repair liquid from leaking from a flow channel during storage, U.S. Pat. No. 7,854,242 proposes attaching a closing member to (a tube attached to) a second flow channel for example. The closing member proposed in U.S. Pat. No. 7,854,242 is attached to a tip end of the tube, and is primarily provided with a closing plug that opens a flow channel by the pressure of air fed into the container during puncture repair, an outer frame where the closing plug fits in a closed condition, and a mechanism for preventing a closing plug that has become separated from the frame from entering a flow channel.

Indeed, with the closing member, the second flow channel can be opened using compressed air fed into the container during puncture repair work while preventing the puncture repair liquid from leaking from the second flow channel during storage, but there is a problem in that the structure is complicated. In particular, with this structure, the dimensions of the closing plug and outer frame must be strictly controlled. In other words, there are problems where if the closing plug is too loose with regard to the outer frame, leaking cannot be sufficiently prevented, and if the closing plug is too tight with regard to the outer frame, opening the plug by pressure is difficult. Therefore, a closing mechanism of a flow channel with a simple structure and that can reliably and easily open during puncture repair work is required.

SUMMARY

The present technology provides a puncture repair liquid holding container that closes a flow channel by a simple structure and reliably prevents liquid leaking during storage, while allowing the flow channel to easily open during puncture repair work.

A puncture repair liquid holding container is formed from: a container main body provided with a holding portion where puncture repair liquid is held, and an opening portion; and a cap attached to the opening portion, and includes: a first flow channel for the cap to introduce compressed air from outside the container; and a second flow channel for discharging the puncture repair liquid inside the container; wherein a tube extending toward an inner side of the container main body is attached to the second flow channel, the tube is provided with a sealing film that blocks inflow of the puncture repair liquid to the second flow channel, and a closed condition where the sealing film blocks the second flow channel can be switched to an opened condition where the sealing film is broken by container internal pressure such that the second flow channel is opened.

In the present technology, a sealing film is provided on a tube attached to a second flow channel as described above, and therefore, the second flow channel can be reliably closed in a closed condition. Furthermore, the sealing film is broken by container internal pressure increased by compressed air fed during puncture repair work, and therefore, the second flow channel can be easily opened during puncture repair work.

In the present technology, a piercing mechanism for breaking the sealing film is preferably provided inside the tube. By providing the piercing mechanism in this manner, the sealing film can be reliably opened during puncture repair work.

In the present technology, the sealing film is preferably a resin film subjected to a stretching treatment in one direction. Thereby, properties where tearing is easy but breaking is difficult can be provided to the sealing film based on the properties of the resin film subjected to a stretching treatment in one direction, and therefore, the sealing film is easy to break during puncture repair work, and a fragment is less likely to occur when the sealing film breaks, and thus inhibiting the flow of the puncture repair liquid due to a fragment of the sealing film can be prevented.

In the present technology, elongation at break of the sealing film is preferably 100% to 300%. Thereby, the sealing film is configured to not break at a degree of change in internal pressure caused by temperature change during storage, and to break due to increased pressure during puncture repair work, and therefore, the performance of preventing leaking of the puncture repair liquid during storage can be enhanced without reducing opening ease of a flow channel during puncture repair work. Note that in the present technology, the elongation at break is measured in accordance with JIS (Japanese Industrial Standard) K 6251.

DETAILED DESCRIPTION

A configuration of the present technology is described in detail below while referring to the attached drawings.

Figure 1:
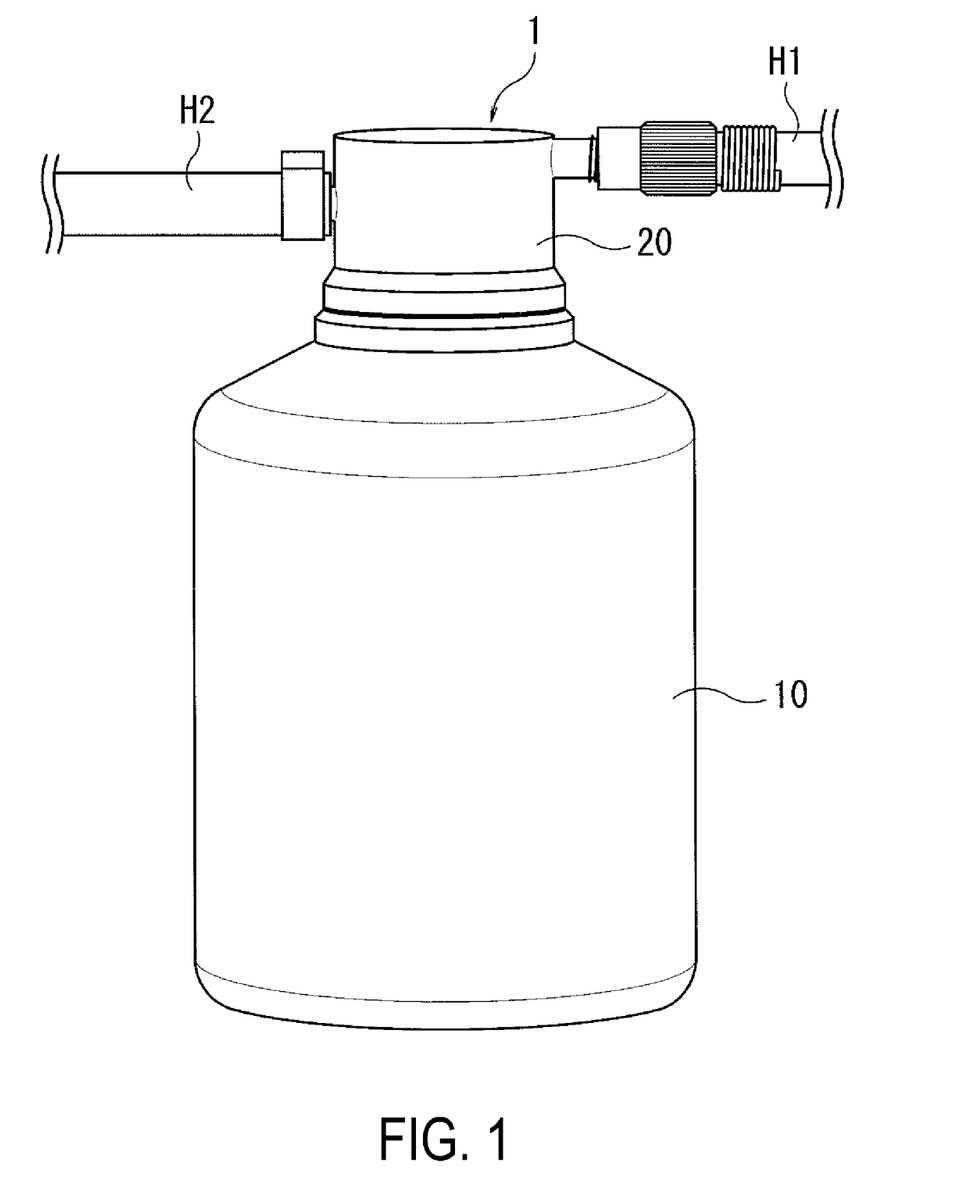
FIG. 1 is a perspective view illustrating an example of a puncture repair liquid holding container according to an embodiment of the present technology.
Figure 2:
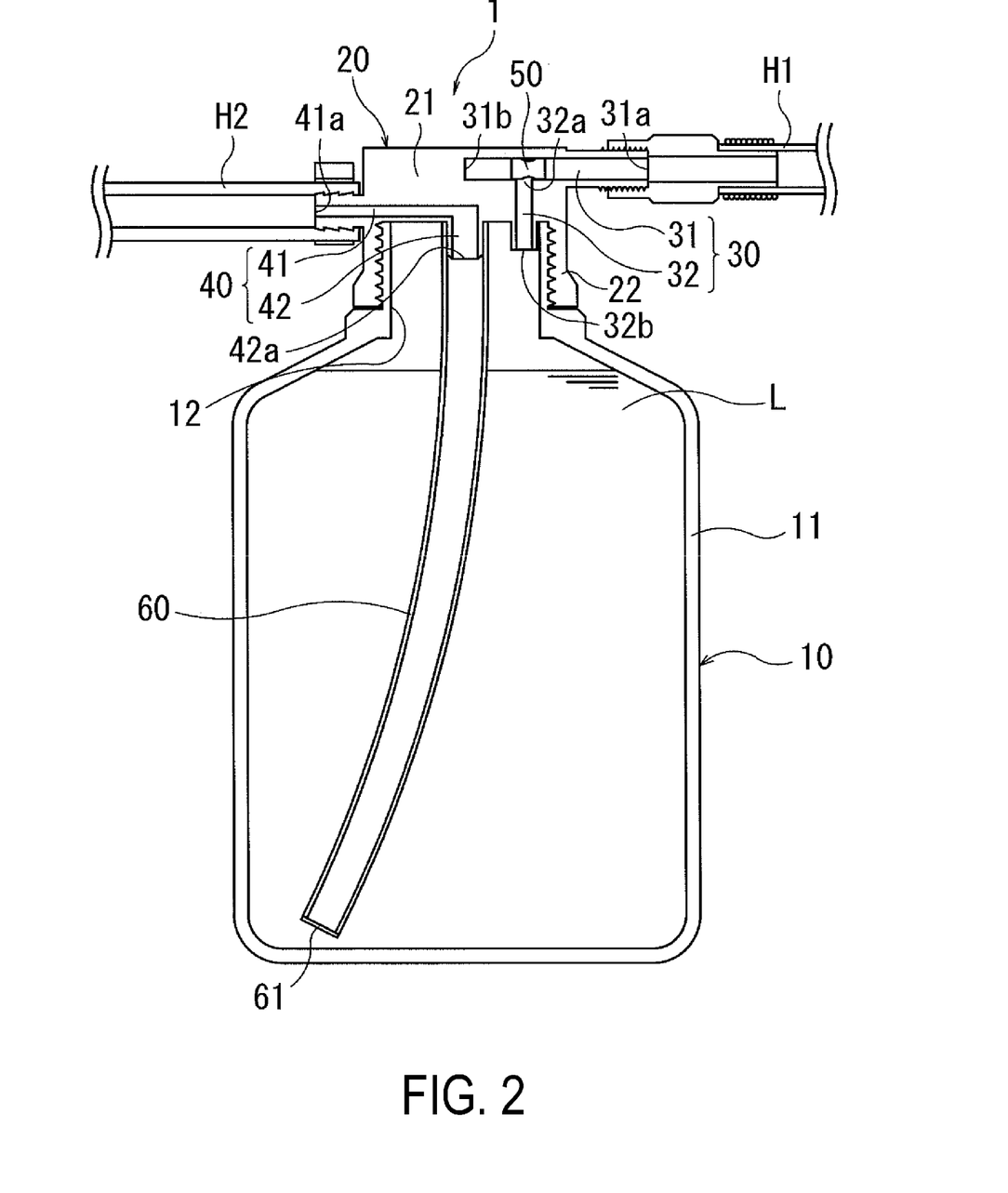
FIG. 2 is a cross-sectional view of the puncture repair liquid holding container in FIG. 1.

As illustrated in FIGS. 1 and 2, a puncture repair liquid holding container 1 of the present technology (hereinafter, referred to as "container 1") is configured from a container main body 10 and a cap 20. Note that FIGS. 1 and 2 illustrate a hose H1 for connecting the container 1 with a high pressure air feeding device, and a hose H2 for the container 1 with a tire, but the structure of the hoses H1, H2 is not particularly limited in the present technology, and therefore, a detailed description will be omitted.

As illustrated in FIGS. 1 and 2, the container main body 10 has an essentially cylindrical shaped holding portion 11 that holds puncture repair liquid L (hereinafter, referred to as "repair liquid L") containing rubber latex, and a cylindrical opening portion 12 positioned on an upper side of the holding portion 11 when the container main body 10 is erected, and where the puncture repair liquid L is discharged during use for example. When the holding container 1 is erected, a bottom surface of the holding portion 11 is positioned on an opposite side from the opening portion 12. In this embodiment, screw thread cutting is performed on an outer circumferential surface of the opening portion 12 so as to mate with a screw on a cap 20 side described later. The holding portion 11 and opening portion 12 are integrally configured from a synthetic resin such as polypropylene, polyethylene, or the like. Note that before the cap 20 described later, the opening portion 12 may be sealed by a film not illustrated in the drawings such that the repair liquid L in the container is prevented from degrading or the repair liquid L is prevented from leaking from the opening portion 12.

As illustrated in FIGS. 1 and 2, the cap 20 is configured from an essentially cylindrical base portion 21, and a mounting portion 22 forming an essentially cylindrical shape with the same outer diameter as the base portion 21, where screw thread cutting for mating with a screw on the opening portion 12 side is performed on an inner circumferential surface thereof. The base portion 21 is provided with a first flow channel 30 for introducing compressed air from outside the container, and a second flow channel 40 for discharging the puncture repair liquid inside the container, as holes penetrating the inside of the base portion 21.

In an example illustrated in the drawings, the first flow channel 30 is configured from a straight portion 31 extending in a direction orthogonal to an axis of the container 1 and a branched portion 32 branching from a middle portion of the straight portion 31, and extending in an axial direction of the container. An elastomer closing plug 50 with an essentially cylindrical shape blocking the straight portion 31 (cylindrical shape having a recessed portion on a middle portion) is slidably inserted in the straight portion 31. An end portion that opens outside of the straight portion 31 protrudes from the base portion 21 such that a hose H1 for connecting the container 1 with the feeding device can be connected. An end portion of the branched portion 32, which opens toward an inner portion of the container main body 10 also protrudes from the base portion 21 toward the inner portion side of the container main body 10. In this example, switching between a closed condition (condition where the closing plug 50 is positioned above the branched portion 32 or positioned closed to an opening end of the straight portion 31 than the branched portion 32) and an opened condition (condition where the closing plug 50 is positioned closed to a closing end side of the straight portion 31 than the branched portion 32) based on the position of the closing plug 50 inside the straight portion 31, but the present technology relates to the se 40 described later, and therefore, the a structure related to the first flow channel 30 is not limited to the aforementioned example.

As illustrated in FIGS. 1 and 2, the second flow channel 40 forms an L shape that includes a horizontal hole portion 41 extending orthogonal to an axis of the container 1 and a vertical hole portion 42 extending in an axial direction of the container 1. An end portion (opening end 41a) on one side of the horizontal hole portion 41 opens outside the container, and the opening end 41a protrudes from the base portion 21. An end portion on another side of the horizontal hole portion 41 connects with the vertical hole portion 42 to form a bent portion. An end portion (opening end 42a) on one side of the vertical hole portion 42 opens toward the inside of the container main body, and the opening end 42a protrudes toward the inside of the container main body 10. An end portion on another side of the vertical hole portion 42 connects with the horizontal hole portion 41 to form a bent portion.

A tube 60 extending toward the inside of the container main body 10 is attached to the opening end 42a of the vertical hole portion 42. The repair liquid L is sent to the second flow channel 40 through the tube 60 during puncture repair work. Therefore, a tip end 60a of the tube 60 reaches near a bottom surface of the container main body 10 (holding portion 11) such that the repair liquid L remains in the container 1. A material of the tube 60 is not particularly limited, but polyvinyl chloride or soft polyethylene can be used for example.

The tube 60 is provided with a sealing film 61 that blocks the second flow channel 40, and is configured such that puncture repair liquid does not flow into the second flow channel 40 based on the sealing film 61 during storage. Furthermore, the sealing film 61 is configured to break due to container internal pressure increased by compressed air fed from a high pressure air feeding device, and thus the second flow channel 40 is opened. Therefore, the sealing film 61 can reliably close the second flow channel in a closed condition where the second flow channel is blocked. Furthermore, the sealing film is broken by container internal pressure increased by compressed air fed during puncture repair work, and therefore, during puncture repair work, the second flow channel can be easily opened without passing through a step for breaking the sealing film 61.

As described above, the sealing film 61 breaks due to compressed air fed from a high pressure air feeding device during puncture repair work, and therefore is preferably configured from a resin film such as polyethylene, polypropylene, or the like for example. In particular, a resin film subjected to a stretching treatment in one direction has properties where tearing is easy but breaking is difficult, and therefore can be preferably used. Thereby, a resin film stretched in one direction is used, and therefore, the sealing film is easy to break during puncture repair work, and a fragment is less likely to occur when the sealing film breaks, and thus the flow of the puncture repair liquid can be prevented from being inhibited by a sealing film fragment.

A thickness of the sealing film 61 is preferably set to 0.1 mm to 1.0 mm for example. When the thickness of the sealing film 61 is less than 0.1 mm, the sealing film 61 will be too thin, and therefore, the second flow channel may be difficult to reliably seal, and in particular, the film may break at an extent where the container internal pressure increases due to temperature change or the like during storage. When the thickness of the sealing film 61 is more than 1.0 mm, the sealing film 61 will be too thick and less likely to break during puncture repair work, and therefore, problems may occur where the container 1 itself fails due to excessive increase in the container internal pressure until the sealing film 61 breaks, or the like.

Furthermore, a sealing film 61 with an elongation at break of 100% to 300% is preferably used. The sealing film 61 having these properties is configured to not break at a degree of change in internal pressure caused by temperature change during storage, and to break due to increased pressure during puncture repair work, and therefore, the performance of preventing leaking of the puncture repair liquid during storage can be enhanced without reducing opening ease of a flow channel during puncture repair work. When the elongation at break of the sealing film 61 is less than 100%, the sealing film 61 may break at an extent where the container internal pressure increases dues to temperature change or the like during storage, and thus the second flow channel 40 is difficult to seal during storage. When the elongation at break of the sealing film 61 exceeds 300%, the sealing film 61 will be difficult to break, and thus problems may occur where the container 1 itself fails due to excessive increase in the container internal pressure until the sealing film 61 breaks.

The sealing film 61 is preferably configured to break when the container internal pressure reaches 200 kPa to 350 kPa such that the second flow channel 40 opens. Thereby, the second flow channel 40 is reliably closed during storage, but the sealing film 61 can be reliably broken at a pressure of compressed air fed into the container 1 during puncture repair work, and therefore, a flow channel can be easily opened during puncture repair.

So long as the sealing film 61 blocks the second flow channel 40, the film may be provided anywhere in the tube 60, but is preferably provided on a tip end 60a of the tube 60a. At this time, the sealing film 61 may be secured by means such as ultrasonic welding, caulking, or the like. Thereby, the sealing film 61 is directly secured to the tube 60 itself, and therefore, the second flow channel 40 can be blocked by a simple structure without adding a complex member.

Figure 3A:
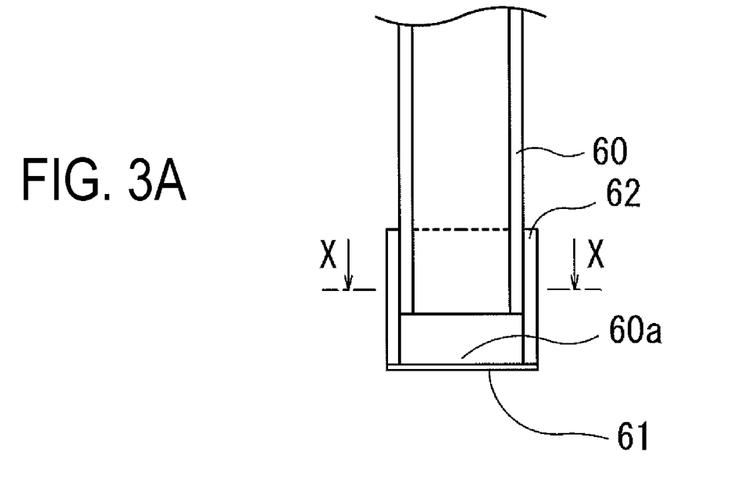
FIGS. 3A and 3B are cross-sectional views enlarging a tip end of a tube in a puncture repair liquid holding container according to another embodiment of the present technology.
Figure 3B:
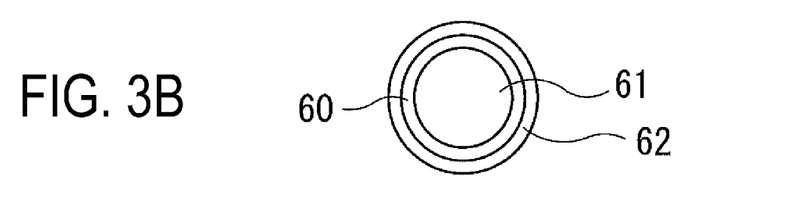

As illustrated in FIG. 3, the sealing film 61 may be attached to the tip end 60a of the tube 60 by attaching a cylindrical member 62 having an inner diameter where the sealing film 61 fits in the tube 60 by attaching to one end. Even in this case, the second flow channel 40 can be blocked by only an additional element with a simple structure of the cylindrical member 62 provided with the sealing film 61 on one end. Thereby, if the cylindrical member 62 is attached, the cylindrical member 62 may be secured to the tube 60 by means such as adhering, welding, or the like in addition to fitting the cylindrical member 62 in the tube 60. Note that FIG. 3A illustrates a cross section of the tube 60 in a longitudinal direction, and FIG. 3B is a cross-sectional view as viewed in the direction of arrow X-X in FIG. 3A.

Figure 4A:
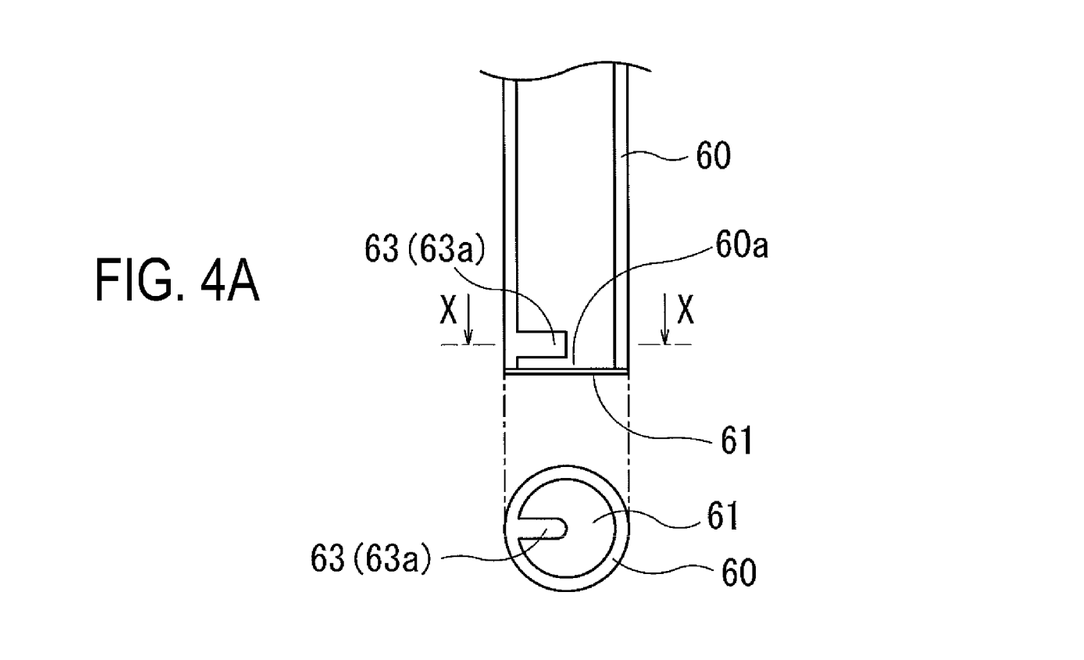
FIGS. 4A and 4B are cross-sectional views enlarging a tip end of a tube in a puncture repair liquid holding container according to another embodiment of the present technology.
Figure 4B:
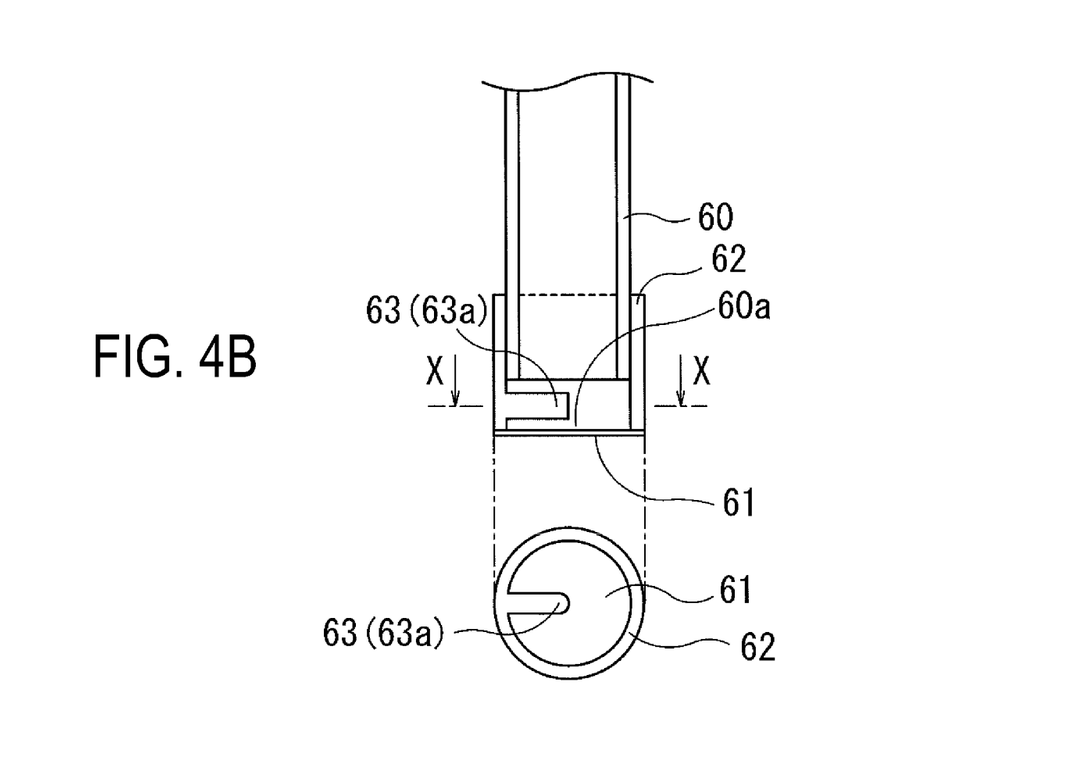
Figure 5A:
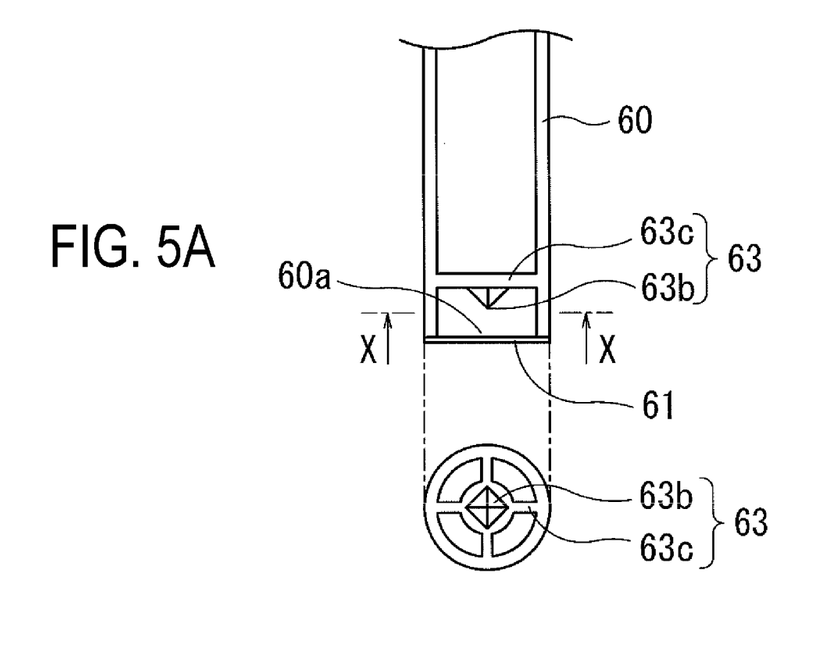
FIGS. 5A and 5B are cross-sectional views enlarging a tip end of a tube in a puncture repair liquid holding container according to another embodiment of the present technology.
Figure 5B:
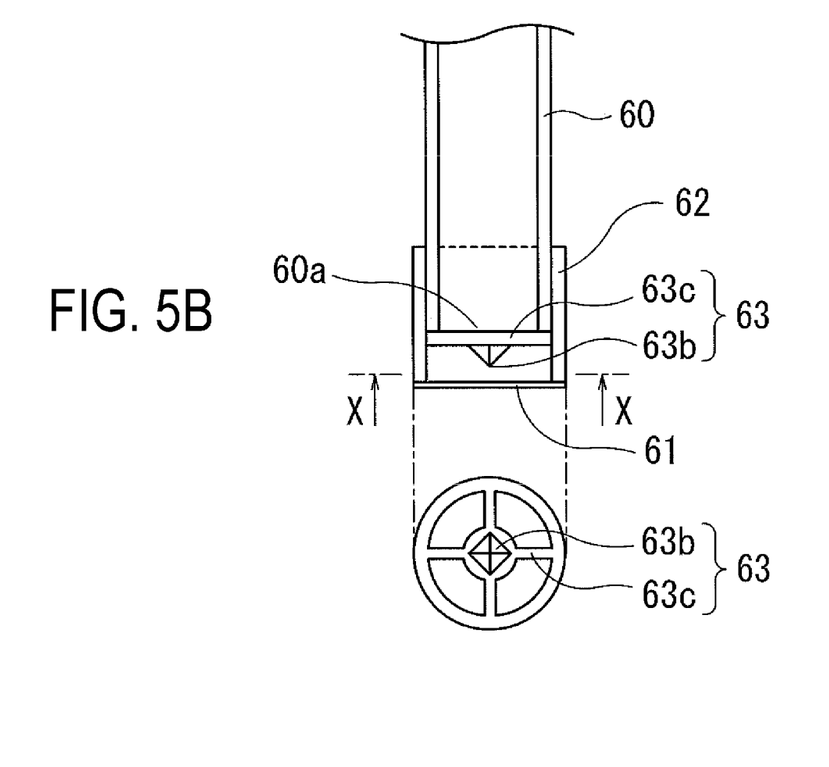

In any case, as illustrated in FIGS. 4 and 5, a piercing mechanism 63 for breaking the sealing film 61 is preferably provided inside the tube 60. In an example in FIG. 4, the piercing mechanism 63 is directly provided on an inner surface of the tube 60, and in an example in FIG. 5, the cylindrical member 62 is used, and the piercing mechanism 63 is provided on an inner surface of the cylindrical member 62. By providing the piercing mechanism 63 in this manner, the sealing film 61 is broken by the piercing mechanism 63 in addition to the increased container internal pressure during puncture repair work, and therefore, the probability that the second flow channel 40 will open can be reliably increased. Note that FIGS. 4 and 5 collectively illustrate a cross section in a longitudinal direction of the tube 60, and a cross-sectional view as viewed in the direction of arrow X-X.

Figure 6A:
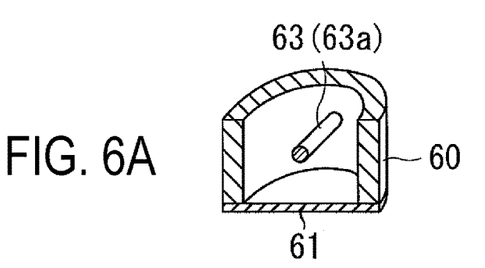
FIGS. 6A to 6E are perspective views illustrating an example of an aspect of a piercing mechanism according to the present technology.
Figure 6B:
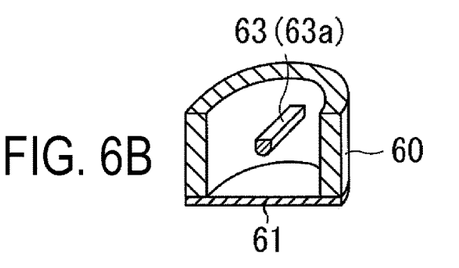
Figure 6C:
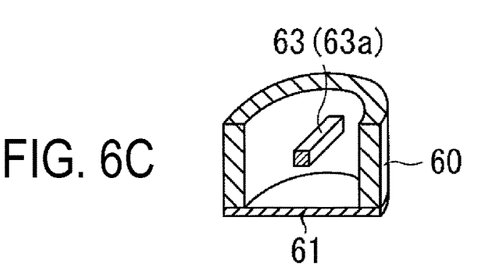
Figure 6D:
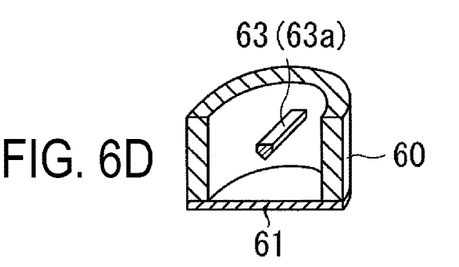
Figure 6E:
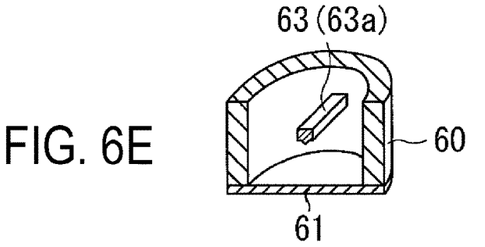

As illustrated in FIG. 4, a protrusion protruding from an inner wall surface of the tube 60 (or cylindrical member 62) can be used as the piercing mechanism 63 for example. In an example in FIG. 4A, a protrusion protruding in a linear shape toward a center of the tube 60 from one point of an inner wall surface of the tube 60 is formed. In an example in FIG. 4B, a protrusion 63a protruding in a linear shape toward a center of the tube 60 from one point of an inner wall surface of the cylindrical member 62 fitted on the tip end 60a of the tube 60 is formed. The piercing mechanism 63 (protrusion 63a) does not contact the sealing film 61 during storage, but contacts the sealing film 61 when the container internal pressure is increased during puncture repair work and the sealing film 61 bulges toward an inner portion of the tube 60, such that the sealing film 61 breaks. The cross-sectional shape of the piercing mechanism 63 (protrusion 63a) is not particularly limited, and a circular shape as illustrated in FIG. 6A, a semi-circular shape as illustrated in FIG. 6B, a square shape as illustrated in FIG. 6C, or the like can be used, but in particular, performance of the piercing mechanism 63 of breaking the sealing film 61 can be enhanced by having a corner portion on the sealing film 61 side as illustrated in FIG. 6D or FIG. 6E. Note that FIGS. 6A to 6E are explanatory diagrams illustrating a cut-out portion of the tip end 60a of the tube 60, and illustrate cases where the piercing mechanism 63 (protrusion 63a) is directly provided on the tube 60, but a case where the piercing mechanism 63 (protrusion 63a) is provided on the cylindrical member 62 can also have a similar shape.

Alternatively, as illustrated in FIG. 5, the piercing mechanism 63 may be configured from a piercing portion 63b positioned in a center of the tube 60 (or cylindrical member 62) and that protrudes toward the sealing film, and an arm portion 63c that supports the piercing portion. Specifically, in an example in FIG. 5A, the piercing mechanism 63 formed from a quadrangular pyramid-shaped piercing portion 63b oriented such that an apex faces the sealing film 61, and four arm portions 63c that extend from an inner wall surface of the tube 60 and support the piercing portion 63b is provided so as to be positioned in a center of the tube 60 and protrude toward the sealing film 61. In an example in FIG. 5B, the piercing mechanism 63 formed from a quadrangular pyramid-shaped piercing portion 63b oriented such that an apex faces the sealing film 61, and four arm portions 63c that extend from an inner wall surface of the cylindrical member 62 fitted on a tip end 60a of the tube 60 and support the piercing portion 63b is provided so as to be positioned in a center of the tube 60 and protrude toward the sealing film 61. The piercing mechanism 63a also does not contact the sealing film 61 during storage, but the piercing portion 63b contacts the sealing film 61 when the container internal pressure is increased during puncture repair work and the sealing film 61 bulges toward the inside of the tube 60, such that the sealing film 61 breaks.

Note that when the piercing mechanism 63 is provided on the cylindrical member 62 as illustrated in FIG. 5 rather than directly providing inside the tube 60, a piercing mechanism 63 with various shapes are easily provided, and therefore, if the piercing mechanism 63 is provided, using the cylindrical member 62 is advantageous.

As described above, the piercing mechanism 63 contacts the sealing film 61 when the container internal pressure increases during puncture repair work and the sealing film 61 bulges, without contacting the sealing film 61 during storage, such that the sealing film 61 breaks, and therefore, the piercing member is preferably disposed at a position separated 1.0 mm to 2.5 mm from the sealing film 61. By disposing at this position, even if the container internal pressure changes due to temperature change or the like during storage and the sealing film 61 expands toward the inside of the tube, even most expanded portion of the sealing film will not reach the piercing mechanism 63 at an expanding extent caused by internal pressure change due to temperature change or the like during storage, and thus the sealing film 61 can be prevented from accidentally breaking during storage. When a separation distance L of the piercing mechanism 63 from the sealing film 61 is less than 1.0 mm, the piercing mechanism 63 may contact the sealing film 61 at an extent where the sealing film 61 expands due to increased pressure caused by temperature change or the like during storage, and thus the sealing film 61 may accidentally break during storage. When the separation distance L of the piercing mechanism 63 from the sealing film 61 is more than 2.5 mm, the piercing mechanism 63 may not sufficiently contact the sealing film 61 even when the container internal pressure is increased by compressed air fed into the container 1 during puncture repair work, and thus the piercing mechanism 63 may not function sufficiently.

The invention claimed is:

1. A puncture repair liquid holding container formed from: a container main body provided with a holding portion where puncture repair liquid is held, and an opening portion; and a cap attached to the opening portion, comprising:

a first flow channel for the cap to introduce compressed air from outside the container;

a second flow channel for discharging the puncture repair liquid inside the container;

a piercing mechanism for breaking a sealing film on an inner portion of a tube, the piercing mechanism comprising a protrusion protruding from an inner wall surface of the tube;

the tube extending toward an inner side of the container main body attached to the second flow channel, the tube being provided with the sealing film that blocks inflow of the puncture repair liquid to the second flow channel, and a closed condition where the sealing film blocks the second flow channel can be switched to an opened condition where the sealing film is broken by container internal pressure such that the second flow channel is opened; and a cylindrical member fitted onto an exterior of a tip end of the tube opposite to an end where the tube is attached to the second flow channel, the piercing member and the sealing film being a part of the cylindrical member and being attached to the tube by the fitting of the cylindrical member to the tube;

wherein the sealing film has a diameter larger than an outer diameter of the tube.

2. The puncture repair liquid holding container according to claim 1, wherein the sealing film is a resin film subjected to a stretching treatment in one direction.

3. The puncture repair liquid holding container according to claim 2, wherein an elongation at break of the sealing film measured in accordance with JIS K6251 is 100% to 300%.

4. The puncture repair liquid holding container according to claim 1, wherein an elongation at break of the sealing film measured in accordance with JIS K6251 is 100% to 300%.

* * * * *